(12) United States Patent
Toyoda

(10) Patent No.: US 11,394,029 B2
(45) Date of Patent: Jul. 19, 2022

(54) SLURRY COMPOSITION FOR NON-AQUEOUS SECONDARY BATTERY FUNCTIONAL LAYERS, NON-AQUEOUS SECONDARY BATTERY FUNCTIONAL LAYER, AND NON-AQUEOUS SECONDARY BATTERY

(71) Applicant: ZEON CORPORATION, Tokyo (JP)

(72) Inventor: Yujiro Toyoda, Tokyo (JP)

(73) Assignee: ZEON CORPORATION, Tokyo (JP)

(*) Notice: Subject to any disclaimer, the term of this patent is extended or adjusted under 35 U.S.C. 154(b) by 398 days.

(21) Appl. No.: 16/487,565

(22) PCT Filed: Mar. 8, 2018

(86) PCT No.: PCT/JP2018/009076
§ 371 (c)(1),
(2) Date: Aug. 21, 2019

(87) PCT Pub. No.: WO2018/168657
PCT Pub. Date: Sep. 20, 2018

(65) Prior Publication Data
US 2019/0379048 A1    Dec. 12, 2019

(30) Foreign Application Priority Data
Mar. 13, 2017    (JP) .............................. JP2017-047560

(51) Int. Cl.
| | |
|---|---|
| *H01M 4/02* | (2006.01) |
| *H01M 4/62* | (2006.01) |
| *C08K 3/013* | (2018.01) |
| *C08L 1/28* | (2006.01) |
| *H01M 4/13* | (2010.01) |
| *H01M 50/409* | (2021.01) |

(52) U.S. Cl.
CPC ............... *H01M 4/62* (2013.01); *C08K 3/013* (2018.01); *C08L 1/286* (2013.01); *H01M 4/13* (2013.01); *H01M 50/409* (2021.01); *C08K 2201/001* (2013.01); *C08L 2203/20* (2013.01)

(58) Field of Classification Search
CPC ...................................................... H01M 4/02
See application file for complete search history.

(56) References Cited

U.S. PATENT DOCUMENTS

| | | | |
|---|---|---|---|
| 8,940,442 B2 | 1/2015 | Fukumine et al. | |
| 2012/0231337 A1* | 9/2012 | Miyata | H01M 4/26 524/576 |
| 2015/0140404 A1* | 5/2015 | Yoo | H01M 50/403 429/145 |
| 2015/0166761 A1* | 6/2015 | Bae | C04B 18/022 524/437 |
| 2016/0359156 A1 | 12/2016 | Ohkubo | |
| 2017/0250400 A1* | 8/2017 | Al | H01M 4/133 |

FOREIGN PATENT DOCUMENTS

| | | | |
|---|---|---|---|
| JP | H1167213 A | * | 3/1999 |
| JP | 2007001198 A | | 1/2007 |
| JP | 2013145763 A | | 7/2013 |
| JP | 5434598 B2 | | 3/2014 |
| JP | 2015023015 A | | 2/2015 |
| JP | 2015185482 A | | 10/2015 |
| JP | 2016013623 A | | 1/2016 |
| JP | 2016216550 A | | 12/2016 |
| WO | 2015129408 A1 | | 9/2015 |

OTHER PUBLICATIONS

Dec. 9, 2020, the Extended European Search Report issued by the European Patent Office in the corresponding European Patent Application No. 18767195.3.
Sep. 17, 2019, International Preliminary Report on Patentability issued in the International Patent Application No. PCT/JP2018/009076.

* cited by examiner

*Primary Examiner* — Jacob B Marks
(74) *Attorney, Agent, or Firm* — Kenja IP Law PC

(57) ABSTRACT

A slurry composition for non-aqueous secondary battery functional layers contains non-conductive particles, a water-soluble polymer having an average degree of polymerization of 50 or more and 450 or less, a binder, and water.

9 Claims, No Drawings

SLURRY COMPOSITION FOR NON-AQUEOUS SECONDARY BATTERY FUNCTIONAL LAYERS, NON-AQUEOUS SECONDARY BATTERY FUNCTIONAL LAYER, AND NON-AQUEOUS SECONDARY BATTERY

TECHNICAL FIELD

The present disclosure relates to a slurry composition for non-aqueous secondary battery functional layers, a non-aqueous secondary battery functional layer, and a non-aqueous secondary battery.

BACKGROUND

Non-aqueous secondary batteries (hereinafter, also referred to simply as "secondary batteries"), such as lithium ion secondary batteries, have characteristics such as compact size, light weight, high energy density, and the ability to be repeatedly charged and discharged, and are used in a wide variety of applications. A non-aqueous secondary battery generally includes battery members such as a positive electrode, a negative electrode, and a separator that isolates the positive electrode and the negative electrode from one another and prevents short circuiting between the positive and negative electrodes.

Battery members including functional layers for imparting desired performance (for example, heat resistance or strength) on these battery members are used in secondary batteries. Specifically, a separator obtained by forming a functional layer on a separator substrate or an electrode obtained by forming a functional layer on an electrode substrate including an electrode mixed material layer on a current collector may, for example, be used as a battery member. Moreover, a functional layer composed of a porous membrane layer formed by binding non-conductive particles using a binder (binding agent) is one example of a functional layer that can improve heat resistance, strength, or the like of a battery member. This functional layer can be formed, for example, by applying a slurry composition for functional layers which contains non-conductive particles, a binder, and a dispersion medium, such as water, onto a surface of a substrate (for example, a separator substrate or an electrode substrate), and then drying the applied slurry composition for functional layers.

In recent years, efforts have been made for improving functional layers aiming at further enhancing the performances of secondary batteries (for example, refer to Patent Literatures 1 and 2).

Specifically, Patent Literature 1 has proposed inclusion of a water-soluble polymer of an average degree of polymerization from 500 to 2500, an inorganic filler, and a water-insoluble particulate polymer, in order to form functional layers constituted from porous membrane layers. The porous membrane layers of Patent Literature 1 have excellent film uniformity, and therefore contribute to improvements in the cell characteristics, such as the cycle characteristics and the rate characteristics, when they are used in secondary batteries.

In addition, Patent Literature 2 has proposed a laminated porous film provided with a heat resistant layer (in other words, functional layer) that is formed by applying, on a porous polypropylene resin film, a coating liquid containing a filler, a resin binder containing a modified acetal water-soluble resin with an average degree of polymerization from 100 to 1000, and water. Such a laminated porous film experiences less frequent detachments of the filler, and has excellent heat resistance or the like.

CITATION LIST

Patent Literature

Patent Literature 1: JP5434598B
Patent Literature 2: JP2016-013623A

SUMMARY

Technical Problem

There is, however, room for improvement in the functional layers disclosed in Patent Literatures 1 and 2 in terms of an improvement of the heat contraction resistance, and an enhancement of the high-temperature cycle characteristics of secondary batteries provided with such functional layers. There is also room for improving the slurry and coating liquids for porous membranes used for formation of functional layers disclosed in Patent Literatures 1 and 2, in terms of an enhancement of the dispersibility of the slurry and coating liquids for porous membranes.

Accordingly, the present disclosure is directed to providing a slurry composition for non-aqueous secondary battery functional layers which has excellent dispersibility and enables formation of a non-aqueous secondary battery functional layer having excellent heat contraction resistance.

The present disclosure is also directed to providing a non-aqueous secondary battery functional layer that has excellent heat contraction resistance and allows a non-aqueous secondary battery to exhibit excellent high-temperature cycle characteristics.

The present disclosure is also directed to providing a non-aqueous secondary battery having excellent high-temperature cycle characteristics.

Solution to Problem

The inventors conducted diligent investigation with the aim of solving the problems set forth above. The inventors discovered that, in a slurry composition for non-aqueous secondary battery functional layers including a water-soluble polymer, a binder, a non-conductive particles, and water, the average degree of polymerization of the water-soluble polymer within the certain range increased the dispersibility of the slurry composition, as well as enabling formation of non-aqueous secondary battery functional layers having excellent heat contraction resistance, thereby completing the present disclosure.

More specifically, the present disclosure is directed to advantageously solving the aforementioned issues, and the slurry composition for non-aqueous secondary battery functional layers of the present disclosure is a slurry composition for non-aqueous secondary battery functional layers comprising non-conductive particles, a water-soluble polymer, a binder, and water, wherein an average degree of polymerization of the water-soluble polymer is 50 or more and 450 or less. By setting the average degree of polymerization of the water-soluble polymer within the certain range, the dispersibility of the slurry composition is increased, and formation of non-aqueous secondary battery functional layers having excellent heat contraction resistance is made possible.

The "water-soluble polymer" in the present disclosure refers to a polymer that, when 0.5 g of the polymer is dissolved in 100 g of water at a temperature of 25° C., insoluble matter is less than 1.0% by mass.

Furthermore, the "average degree of polymerization of the water-soluble polymer" in the present disclosure refers to a value calculated in accordance with the Staudinger's viscosity rule using a limiting viscosity measured by an Ubbelohde viscometer.

In the slurry composition for non-aqueous secondary battery functional layers of the present disclosure, the water-soluble polymer is preferably a cellulosic derivative. A water-soluble polymer that is a cellulosic derivative can improve the high-temperature cycle characteristics of a non-aqueous secondary battery formed using the slurry composition for non-aqueous secondary battery functional layers.

Furthermore, in the slurry composition for non-aqueous secondary battery functional layers of the present disclosure, the water-soluble polymer is preferably a carboxymethylcellulose or a salt of carboxymethylcellulose. A water-soluble polymer that is a carboxymethylcellulose or a salt of carboxymethylcellulose can further improve the high-temperature cycle characteristics of a non-aqueous secondary battery formed using the slurry composition for non-aqueous secondary battery functional layers.

Furthermore, in the slurry composition for non-aqueous secondary battery functional layers of the present disclosure, a degree of etherification of the water-soluble polymer is preferably 0.6 or more. A degree of etherification of the water-soluble polymer of 0.6 or more facilitates further favorable dispersion of the water-soluble polymer into the slurry composition for non-aqueous secondary battery functional layers, thereby further improving the dispersibility of the slurry composition for non-aqueous secondary battery functional layers.

Here, in the present disclosure, the "degree of etherification" of a water-soluble polymer refers to, when the water-soluble polymer is a cellulosic derivative in which at least a part of hydroxy groups in an anhydroglucose as a component is substituted with a substituent(s), such as a carboxyl methyl group, the average number of hydroxy groups substituted with substituents per anhydroglucose unit. The degree of etherification can be a value more than 0 and less than 3. A higher degree of etherification means a lower proportion of hydroxyl groups (i.e., a higher proportion of substituents) in one molecule of the water-soluble polymer, which is a cellulosic derivative. A lower etherification means a higher proportion of hydroxyl groups (i.e., a lower proportion of substituents) in one molecule of the water-soluble polymer, which is a cellulosic derivative.

In the present disclosure, the "degree of etherification" of a water-soluble polymer can be measured by a method described in the EXAMPLES section of the present specification.

Moreover, preferably, in the slurry composition for non-aqueous secondary battery functional layers of the present disclosure, a content of the water-soluble polymer is 0.2 parts by mass or more and 4.5 parts by mass or less per 100 parts by mass of the non-conductive particles. When the content of the water-soluble polymer per 100 parts by mass of the non-conductive particles is 0.2 parts by mass or more and 4.5 parts by mass or less, the adhesiveness of the functional layer to another member improves and the heat contraction resistance can be further increased.

Yet furthermore, preferably, the slurry composition for non-aqueous secondary battery functional layers of the present disclosure further comprises a wetting agent, and a content of the wetting agent is 0.01 parts by mass or more and 2.0 parts by mass or less per 100 parts by mass of the non-conductive particles. The slurry composition for non-aqueous secondary battery functional layers containing the wetting agent in a content in the aforementioned range can further improve the heat contraction resistance of functional layers, and can also increase the high-temperature cycle characteristics of a non-aqueous secondary battery provided with such a functional layer.

Yet furthermore, in the slurry composition for non-aqueous secondary battery functional layers of the present disclosure, a mass ratio of the content of the wetting agent to the content of the water-soluble polymer is preferably 0.05 or more and 1.0 or less. The slurry composition for non-aqueous secondary battery functional layers containing the wetting agent in the aforementioned certain range can further enhance the adhesiveness of the functional layer to another member, and can also further increase the heat contraction resistance.

Moreover, the present disclosure is also directed to advantageously solving the aforementioned issues, and the non-aqueous secondary battery functional layer of the present disclosure is formed using any one of the aforementioned slurry compositions for non-aqueous secondary battery functional layers. Use of the aforementioned slurry composition for non-aqueous secondary battery functional layers can increase the heat contraction resistance of non-aqueous secondary battery functional layers. This hence enables a non-aqueous secondary battery provided with the non-aqueous secondary battery functional layer to exhibit the high-temperature cycle characteristics.

Furthermore, the non-aqueous secondary battery functional layer of the present disclosure preferably has a thickness of 5.0 μm or less. A functional layer that is formed using the slurry composition for non-aqueous secondary battery functional layers of the present disclosure and has a thickness 5.0 μm or less has good heat contraction resistance.

Furthermore, the present disclosure is also directed to advantageously solving the aforementioned issues, and the non-aqueous secondary battery of the present disclosure comprises the aforementioned non-aqueous secondary battery functional layer. Use of the non-aqueous secondary battery functional layer of the present disclosure allows a non-aqueous secondary battery to exhibit excellent high-temperature cycle characteristics.

Advantageous Effect

The slurry composition for non-aqueous secondary battery functional layers of the present disclosure has an excellent dispersibility, and this slurry composition enables formation of non-aqueous secondary battery functional layers having excellent heat contraction resistance.

Additionally, the non-aqueous secondary battery functional layer of the present disclosure allows a non-aqueous secondary battery to exhibit excellent high-temperature cycle characteristics.

Furthermore, the present disclosure enables provision of a non-aqueous secondary battery having excellent high-temperature cycle characteristics.

DETAILED DESCRIPTION

Embodiments of the present disclosure will be described in detail below.

The slurry composition for non-aqueous secondary battery functional layers of the present disclosure is used as a material for preparing non-aqueous secondary battery functional layers. Moreover, the non-aqueous secondary battery functional layer of the present disclosure is formed using the slurry composition for non-aqueous secondary battery functional layers of the present disclosure. Furthermore, the non-aqueous secondary battery of the present disclosure comprises at least the non-aqueous secondary battery functional layer of the present disclosure.

(Slurry Composition for Non-Aqueous Secondary Battery Functional Layers)

The slurry composition for non-aqueous secondary battery functional layers of the present disclosure is a slurry composition comprising water as a dispersion medium, which contains non-conductive particles, a water-soluble polymer, and a binder, and optionally contains an additive and the like. In the slurry composition for non-aqueous secondary battery functional layers of the present disclosure, the water-soluble polymer has an average degree of polymerization of 50 or more and 450 or less.

Since the slurry composition for non-aqueous secondary battery functional layers of the present disclosure contains the water-soluble polymer having an average degree of polymerization of 50 or more and 450 or less, it has an excellent dispersibility, as well as enabling favorable formation of functional layers having excellent heat contraction resistance. Accordingly, a non-aqueous secondary battery having excellent high-temperature cycle characteristics can be obtained by using the slurry composition for non-aqueous secondary battery functional layers of the present disclosure.

<Non-Conductive Particles>

The non-conductive particles are particles that maintain their shape without dissolving in water as the dispersion medium or a non-aqueous electrolyte solution of a secondary battery. The non-conductive particles are electrochemically stable, and are therefore present stably in a functional layer in the environment of use of a secondary battery.

Various types of inorganic particles and organic particles can be used as the non-conductive particles.

Specifically, both inorganic fine particles and organic fine particles other than a particulate polymer that can be used as a binder (described later), may be used as the non-conductive particles. The non-conductive particles are preferably made from a material that is present stably in the use environment of non-aqueous secondary batteries and is electrochemically stable.

Preferred examples of inorganic fine particles as non-conductive particles include particles of oxides such as aluminum oxide (alumina), hydrated aluminum oxide (boehmite (AlOOH)), gibbsite ($Al(OH)_3$), silicon oxide, magnesium oxide (magnesia), calcium oxide, titanium oxide (titania), barium titanate ($BaTiO_3$), ZrO, and alumina-silica composite oxide; particles of nitrides such as aluminum nitride and boron nitride; particles of covalent crystals such as silicon and diamond; particles of sparingly soluble ionic crystals such as barium sulfate, calcium fluoride, barium fluoride, and calcium carbonate; and fine particles of clays such as talc and montmorillonite. These particles may be subjected to element substitution, surface treatment, solid solution treatment, or the like as necessary.

The organic fine particles as the non-conductive particles are made from an organic compound different from the particulate polymer as the binder described later. In other words, the organic fine particles have no binding capacity. Preferred examples of organic fine particles include particles of various crosslinked polymers such as crosslinked polymethyl methacrylate, crosslinked polystyrene, crosslinked polydivinyl benzene, crosslinked styrene-divinyl benzene copolymer, polystyrene, polyimide, polyamide, polyamide imide, melamine resin, phenolic resin, and benzoguanamine-formaldehyde condensate; and particles of heat resistant polymers such as polysulfone, polyacrylonitrile, polyaramid, polyacetal, and thermoplastic polyimide. The organic fine particles may be modifiers and derivative of these.

The glass-transition temperature of the organic fine particles as the non-conductive particles is preferably higher than 20° C., and is usually 350° C. or lower. The glass-transition temperature of the organic fine particles can be measured in accordance with JIS K7121.

Of these, non-conductive particles are preferably alumina particles, boehmite particles, and (crosslinked) polystyrene particles, and more preferably alumina particles and (crosslinked) polystyrene particles.

One of these types of non-conductive particles may be used individually, or two or more of these types of non-conductive particles may be used in combination.

The volume average particle diameter of the non-conductive particles is preferably 0.1 μm or more, and more preferably 0.2 μm or more, and is preferably 5 μm or less, and more preferably 2 μm or less. A volume average particle diameter of the non-conductive particles of 0.1 μm or more can reduce an increase in the Gurley value (i.e., a decrease in the ion conductivity) of a functional layer, and can improve the rate characteristics of a secondary battery provided with the functional layer. Moreover, a volume average particle diameter of the non-conductive particles of 5 μm or less can increase the density of a functional layer, thereby enhancing the heat contraction resistance of the functional layer.

The "volume average particle diameter of non-conductive particles" in the present disclosure is a particle diameter (D50) at which, in a particle diameter distribution (volume basis) measured by laser diffraction, the cumulative volume calculated from a small-diameter end of the distribution reaches 50%.

<Water-Soluble Polymer>

The water-soluble polymer can function as a viscosity modifier that modifies the viscosity of the slurry composition for non-aqueous secondary battery functional layers of the present disclosure, as well as functioning as a component for enhancing heat contraction resistance of functional layers formed using the slurry composition for functional layers while binding the components, such as non-conductive particles, in the functional layers, together with the binder. Examples of the water-soluble polymer include synthetic polymers, natural polymers, and semi-synthetic polymers. Of these, semi-synthetic polymers are preferably used as the water-soluble polymer.

[Synthetic Polymers]

A synthetic polymer is a polymer compound that is artificially produced through a chemical reaction. Such synthetic polymers can be classified into poly(meth)acrylic acid polymer compounds, poly(meth)acrylic acid ester polymer compounds, polyvinyl polymer compounds, polyurethane polymer compounds, polyether polymer compounds, and so forth.

Examples of poly(meth)acrylic acid polymer compounds include polyacrylic acid, polymethacrylic acid, and salts thereof. Examples of polyvinyl polymer compounds and polyurethane polymer compounds include nonionic, cationic, and amphoteric polymer compounds. Furthermore, examples of polyether polymer compounds include polyethylene glycol, polypropylene glycol, and polyethylene glycol/polypropylene glycol.

[Natural Polymers]

Examples of natural polymers include polysaccharides and proteins derived from plants and animals. Other examples of natural polymers that can be used in some situations include those that have been subjected to fermentation treatment by microorganisms or the like, or treatment by heat. These natural polymers can be classified into plant-based natural polymers, animal-based natural polymers, microorganism-produced natural polymers, and so forth.

Examples of plant-based natural polymers include gum arabic, gum tragacanth, galactan, guar gum, carob gum, karaya gum, carrageenan, pectin, kannan, quince seed (marmelo), algal colloid (phaeophyceae extract), starch (for example, starch derived from rice, corn, potato, or wheat), and glycyrrhizin.

Examples of animal-based natural polymers include collagen, casein, albumin, gelatin, chitin, and chitosan.

Examples of microorganism-produced natural polymers include xanthan gum, dextran, succinoglucan, and pullulan.

[Semi-Synthetic Polymers]

A semi-synthetic polymer is obtained through modification of natural polymers through a chemical reaction. Such semi-synthetic polymers can be classified into cellulosic derivatives, starch-based semi-synthetic polymers, alginic acid-based semi-synthetic polymers, animal- or microorganism-produced semi-synthetic polymers, and so forth. Of these, cellulosic derivatives are preferably used as the water-soluble polymer.

Cellulosic derivatives can be classified into nonionic, anionic, and cationic.

Examples of nonionic cellulosic derivatives include alkyl celluloses such as methyl cellulose, methyl ethyl cellulose, ethyl cellulose, and microcrystalline cellulose; and hydroxyalkyl celluloses such as hydroxyethyl cellulose, hydroxybutyl methylcellulose, hydroxypropyl cellulose, hydroxypropyl methylcellulose, hydroxyethyl methylcellulose, hydroxypropyl methylcellulose stearoxy ether, carboxymethyl hydroxyethyl cellulose, alkyl hydroxyethyl cellulose, and nonoxynyl hydroxyethyl cellulose.

Examples of anionic cellulosic derivatives include substitution products obtained by substitution of the nonionic cellulosic derivatives described above with various derivative groups and salts (sodium salts, ammonium salts, and the like) of these substitution products. Specific examples include sodium cellulose sulfate, and carboxymethyl cellulose (CMC), and salts thereof.

Examples of cationic cellulosic derivatives include low nitrogen hydroxyethyl cellulose dimethyldiallyl ammonium chloride (polyquaternium-4), O-[2-hydroxy-3-(trimethylammonio)propyl]hydroxyethyl cellulose chloride (polyquaternium-10), and O-[2-hydroxy-3-(lauryldimethylammonio)propyl]hydroxyethyl cellulose chloride (polyquaternium-24).

Examples of starch-based semi-synthetic polymers include solubilized starch, carboxymethyl starch, methylhydroxypropyl starch, and modified potato starch.

Examples of alginic acid-based semi-synthetic polymers include sodium alginate and propylene glycol alginate.

Examples of animal-derived semi-synthetic polymers include water-soluble chitin derivative, water-soluble chitosan derivatives. Examples of microorganism-produced semi-synthetic polymers include chemically modified products of xanthan gum, dehydroxanthan gum, dextran, succinoglucan, pullulan, and the like.

Of these, from the perspective of improving the heat contraction resistance of functional layers, the water-soluble polymer is preferably hydroxyethyl cellulose, carboxymethyl cellulose, and a salt of carboxymethyl cellulose, and more preferably carboxymethyl cellulose or a salt of carboxymethyl cellulose.

[Average Degree of Polymerization of Water-Soluble Polymer]

The average degree of polymerization of the water-soluble polymer needs to be 50 or more and 450 or less. Furthermore, the average degree of polymerization of the water-soluble polymer is preferably 125 or more, more preferably 150 or more, and even more preferably 400 or less.

An average degree of polymerization of the water-soluble polymer of not less than the aforementioned lower limit can impart the structural strengths to functional layers formed using the slurry composition containing the water-soluble polymer, thereby increasing the heat contraction resistance of the functional layers. An average degree of polymerization of the water-soluble polymer of not more than the aforementioned upper limit can increase the dispersibility of the water-soluble polymer into the slurry composition, thereby improving the dispersibility of the slurry composition.

[Degree of Etherification of Water-Soluble Polymer]

The degree of etherification of the cellulosic derivative as the water-soluble polymer is preferably 0.6 or more, more preferably 0.7 or more, and even more preferably 0.8 or more, and is preferably 1.5 or less, more preferably 1.3 or less, and even more preferably 1.0 or less.

A degree of etherification of the water-soluble polymer of water-soluble polymer of not less than the aforementioned lower limit ensures an adequate number of substituents, such as carboxymethyl groups, which improves the solubility of the water-soluble polymer, particularly into an aqueous solvent. This increases the solubility of the water-soluble polymer into water, which enhances the dispersibility of the water-soluble polymer in the slurry composition, resulting in an increased dispersibility of the slurry composition per se. Particularly, an improvement in the dispersibility of the slurry composition achieved by increasing the dispersibility of the water-soluble polymer is beneficial to the dispersibility of the slurry composition that was stored after being prepared and then is subjected to dispersion treatment once again (hereinafter referred to as the "slurry redispersibility"). When the degree of etherification of the water-soluble polymer is not more than the aforementioned upper limit, the number of substituents, such as carboxymethyl groups, is not too high, and thus solubility of the water-soluble polymer in an aqueous solvent is prevented from becoming excessively high. If the solubility of the water-soluble polymer is too high, the amount of water-soluble polymer absorbed in the non-conductive particles in the slurry composition to function to enhance the dispersibility of the non-conductive particles, would be reduced. As a result, the dispersibility of the non-conductive particles into the slurry composition may be unsatisfactorily low. Therefore, by setting the degree of etherification of the water-soluble polymer not to exceed the aforementioned upper limit can prevent local aggregation of the non-conductive particles in a functional layer formed using a slurry composition containing the water-soluble polymer. This prevents an excessive increase in the Gurley value of the functional layer, thereby improving the rate characteristics of a secondary battery provided with that functional layer.

[Content of Water-Soluble Polymer]

The content of the water-soluble polymer in the slurry composition for non-aqueous secondary battery functional layers of the present disclosure is preferably 0.2 parts by mass or more, more preferably 0.3 parts by mass or more, and even more preferably 0.5 parts by mass or more, and is preferably 4.5 parts by mass or less, more preferably 4.0 parts by mass or less, and even more preferably 3.5 parts by mass or less, per 100 parts by mass of the non-conductive particles. A content of the water-soluble polymer of not less than the aforementioned lower limit can improve the adhesiveness of the functional layer to another member. A content of the water-soluble polymer of not more than the aforementioned upper limit can further improve the heat contraction resistance of functional layers.

<Binder>

The binder can function as a component to bind the components, such as the non-conductive particles, in the functional layer formed using the slurry composition for non-aqueous secondary battery functional layers of the present disclosure. Examples of the binder that may be contained in the slurry composition for non-aqueous secondary battery functional layers of the present disclosure include, but are not limited to, well-known binders, such as a particulate polymer that are present in particulate form in the slurry composition, for example. The particulate polymer is preferably a conjugated diene polymer or an acrylic polymer, and more preferably an acrylic polymer. One of such binders may be used individually, or two or more of such binders may be used in combination. In a functional layer formed using the slurry composition for functional layers, the particulate polymer may be present in a particulate form, or may be present in any other form.

Here, the term "conjugated diene polymer" refers to a polymer that includes a conjugated diene monomer unit. Specific examples of the conjugated diene polymer include, but are not specifically limited to, a copolymer including an aromatic vinyl monomer unit and an aliphatic conjugated diene monomer unit such as a styrene-butadiene copolymer (SBR); butadiene rubber (BR); acrylic rubber (NBR) (copolymer including an acrylonitrile unit and a butadiene unit); and hydrogenated products thereof. The phrase "includes a monomer unit" as used herein means that "a polymer obtained with the monomer includes a structural unit derived from the monomer".

Examples of the acrylic polymer include, but are not limited to, a polymer containing a (meth)acrylic acid ester monomer unit. The acrylic polymer preferably contains 50% by mass of the (meth)acrylic acid ester monomer unit, when the amount of all monomer units included in the polymer is taken as 100% by mass.

Example of (meth)acrylic acid ester monomers that can be used to form the (meth)acrylic acid ester monomer unit contained in the acrylic polymer suitable as the binder include alkyl esters of (meth)acrylic acid such as methyl acrylate, ethyl acrylate, butyl acrylate, methyl methacrylate, ethyl methacrylate, and 2-ethylhexyl acrylate. Note that in the present disclosure, "(meth)acryl" is used to indicate "acryl" and/or "methacryl".

One of such binders may be used individually, or two or more of such binders may be used in combination.

The acrylic polymer that can be preferably used as the binder preferably contains a (meth)acrylonitrile monomer unit. This makes it possible to increase strength of the functional layer. Note that in the present disclosure, "(meth)acrylonitrile" is used to indicate "acrylonitrile" and/or "methacrylonitrile". The acrylic polymer may further contain optionally an acidic group-containing monomer unit, such as methacrylic acid monomer unit, a cross-linkable monomer unit, such as allyl glycidyl ether monomer unit and N-methylol acrylamide monomer unit, and the like.

The above-described acrylic polymer may be produced, but is not limited to, through polymerization of a monomer composition that contains monomers capable of polymerize in an aqueous solvent to form the monomer unit set forth above. At this time, the ratio of each monomer in the monomer composition normally matches the ratio of monomer unit in the acrylic polymer.

No specific limitations are placed on the mode of polymerization. For example, any of solution polymerization, suspension polymerization, bulk polymerization, and emulsion polymerization may be used. Also, any polymerization reaction may be used. For example, ionic polymerization, radical polymerization, or living radical polymerization may be used.

[Glass-Transition Temperature]

The binder preferably has a glass-transition temperature of 20° C. or lower, more preferably 5° C. or lower, even more preferably −10° C. or lower. The binder having a glass-transition temperature of 20° C. or lower can have sufficiently high adhesiveness, sufficiently prevents the components included in a porous membrane from detaching from the porous membrane, as well as sufficiently enhancing the peel strength of the porous membrane. Note that the glass transition temperature of the polymer used as the binder is usually −60° C. or higher, and preferably −50° C. or higher. The glass transition temperature of the polymer can be measured in accordance with JIS K 7121.

[Volume-Average Particle Diameter]

The volume-average particle diameter (D50) of the binder is preferably 0.05 μm or more, and more preferably 0.10 μm or more, and is preferably 0.50 μm or less, and more preferably 0.35 μm or less.

[Content of Binder]

The content of the binder in the slurry composition for non-aqueous secondary battery functional layers of the present disclosure is preferably and 2 parts by mass or more and 10 parts by mass or less per 100 parts by mass of non-conductive particles. By setting the content of the binder to be within the aforementioned range, the peel strength of a functional layer can be improved, and an increase in the internal resistance of the functional layer can be reduced, which improves the rate characteristics of a non-aqueous secondary battery.

<Dispersion Medium>

The slurry composition for non-aqueous secondary battery functional layers of the present disclosure contains water as the dispersion medium. The slurry composition for non-aqueous secondary battery functional layers may also include small amount of a non-water medium, such as an organic solvent, as a dispersion medium.

In the slurry composition for functional layers, the non-conductive particles and the binder are usually dispersed in water. On the other hand, the water-soluble polymer is dissolved into water.

<Wetting Agent>

The slurry composition for non-aqueous secondary battery functional layers of the present disclosure preferably comprises a wetting agent. Examples of the wetting agent include, but are not specifically limited to, surfactants, such as nonionic surfactants and anionic surfactants. Nonion surfactants are preferred from the perspective of easiness of uniform applications. Specific Examples of nonionic surfactants include, but are not limited to, a polyoxyalkylene alkyl aryl ether surfactant, a polyoxyalkylene alkyl ether surfactant, a polyoxyalkylene fatty acid ester surfactant, a sorbitan fatty acid ester surfactant, a silicone surfactant, an acetylene alcohol surfactant, and a fluorine-containing surfactant.

Specific examples of the polyoxyalkylene alkyl aryl ether surfactant include polyoxyethylene nonyl phenyl ether, polyoxyethylene octyl phenyl ether, and polyoxyethylene dodecyl phenyl ether.

Specific examples of the polyoxyalkylene alkyl ethersurfactant include polyoxyethylene oleyl ether and polyoxyethylene lauryl ether.

Specific examples of the polyoxyalkylene fatty acid ester include polyoxyethylene oleate, polyoxyethylene laurate, and polyoxyethylene distearate.

Specific examples of the sorbitan fatty acid ester surfactant include sorbitan laurate, sorbitan monostearate, sorbitan monooleate, sorbitan sesquiolate, polyoxyethylene monooleate, and polyoxyethylene stearate.

Specific examples of the silicone surfactant include dimethylpolysiloxane.

Specific examples of the acetylene alcohol surfactant include 2,4,7,9-tetramethyl-5-decyne-4,7-diol, 3,6-dimethyl-4-octin-3,6-diol, and 3,5-dimethyl-1-hexyne-3-ol.

Specific examples of the fluorine-containing surfactant include fluorine alkyl ester.

Of these, the wetting agent is particularly preferably a polyoxyalkylene alkyl ether surfactant, such as polyoxyethylene lauryl ether.

[Content of Wetting Agent]

The content of the wetting agent in the slurry composition for non-aqueous secondary battery functional layers of the present disclosure is preferably 0.01 parts by mass or more, more preferably 0.05 parts by mass or more, and even more preferably 0.1 parts by mass or more per 100 parts by mass of the non-conductive particles, and is preferably 2.0 parts by mass or less, more preferably 1.5 parts by mass or less, and even more preferably 1.0 parts by mass or less per 100 parts by mass of the non-conductive particles. A content of the wetting agent of not less than the aforementioned lower limit increases the wettability between the slurry composition and a substrate, which enables an uniform application of the slurry composition, thereby increasing the heat contraction resistance of a resultant functional layer. A content of the wetting agent of not more than the aforementioned upper limit can improve the high-temperature cycle characteristics of a secondary battery provided with a functional layer formed using the slurry composition.

[Mass Ratio of Wetting Agent to Content of Water-Soluble Polymer]

The mass ratio of the content of the wetting agent to the content of the water-soluble polymer (hereinafter also referred to as "wetting agent/water-soluble polymer (by mass)") in the slurry composition for non-aqueous secondary battery functional layers of the present disclosure is preferably 0.05 or more, more preferably 0.08 or more, and even more preferably 0.1 or more, and is preferably 1.0 or less, more preferably 0.9 or less, and even more preferably 0.8 or less. A wetting agent/water-soluble polymer (by mass) of not less than the aforementioned lower limit may improve the heat contraction resistance of a functional layer. A wetting agent/water-soluble polymer (by mass) of not more than the aforementioned upper limit can improve the adhesiveness of a functional layer to another member.

<Additive>

The slurry composition for non-aqueous secondary battery functional layers may contain other optional components besides the components described above. Commonly known components can be used as these other components without any specific limitations so long as they do not affect the battery reactions. One of such other components may be used individually, or two or more of such other components may be used in combination.

Examples of the other components include a dispersant, a leveling agent, an antioxidant, an antifoaming agent, a wetting agent, a pH modifier (for example, hydrogen chloride; ammonia; hydroxides of alkali metals such as lithium hydroxide, sodium hydroxide, and potassium hydroxide; hydroxides of alkaline earth metals such as calcium hydroxide and magnesium hydroxide, and the like), and well-known additives, such as an additive for electrolyte solution having a function of suppressing decomposition of the electrolyte solution, for example. For example, the dispersant may be, but is not limited to, water-soluble macromolecules (water-soluble polymer) containing at least two acidic group-containing monomer units, as disclosed in JP2015-185482A, for example. More specifically, water-soluble macromolecules including a sulfo group-containing monomer unit and a carboxylic acid group-containing monomer unit may be used. Such water-soluble macromolecules can make the non-conductive particles to be favorably dispersed. The ratio of sulfo group-containing monomer unit/carboxylic acid group-containing monomer unit in the water-soluble macromolecules may be, as "sulfo group-containing monomer unit/carboxylic acid group-containing monomer unit (by mass)" 1/999 or more and more preferably 0.01 or more, and is preferably 1 or less, more preferably 0.5 or less, and still more preferably 0.3 or less. The definition of the term "water-soluble" used in the water-soluble macromolecules is the same as the definition of that term in the "water-soluble polymer". The average degree of polymerization of water-soluble macromolecules is preferably less than 50 or more than 450. Here, the "average degree of polymerization of water-soluble macromolecules" can be calculated in the same manner as the average degree of polymerization of the water-soluble polymer.

<Method for Producing Slurry Composition for Non-Aqueous Secondary Battery Functional Layers>

The slurry composition for non-aqueous secondary battery functional layers of the present disclosure can be obtained by mixing the above-described non-conductive particles, a water-soluble polymer having an average degree of polymerization of 50 or more and 450 or less, a binder, and an optional additive used as necessary, in the presence of a dispersion medium such as water, but is not specifically limited to being obtained in this manner. In a situation in which the binder is prepared by polymerizing a monomer composition in an aqueous solvent, the binder can be mixed with the other components as-produced in the form of a water dispersion. Moreover, in a situation in which the binder is mixed in the form of a water dispersion, water in the water dispersion may be used as a dispersion medium.

Although no specific limitations are placed on the mixing method and mixing order of the above-described components, the mixing is preferably performed using a disperser as a mixing device to efficiently disperse the components. The disperser is preferably a device that can homogeneously disperse and mix the components. Examples of dispersers that can be used include a ball mill, a sand mill, a pigment disperser, a grinding machine, an ultrasonic disperser, a homogenizer, and a planetary mixer.

(Non-Aqueous Secondary Battery Functional Layer)

The non-aqueous secondary battery functional layer of the present disclosure is a layer that is formed from the aforementioned slurry composition for non-aqueous secondary battery functional layers. It can be formed, for example, by applying the aforementioned slurry composition for functional layers onto the surface of an appropriate substrate to form an applied film, and then drying the applied film that is formed. In other words, non-aqueous secondary battery functional layer of the present disclosure is formed from a dried product of the aforementioned slurry composition for non-aqueous secondary battery functional layers, and typically contains at least non-conductive particles, a water-soluble polymer, a binder, and an optional additive. Note that in a case in which the above-described binder includes a cross-linkable monomer unit, the binder including this cross-linkable monomer unit may be crosslinked when the slurry composition for non-aqueous secondary battery functional layers is dried or may be crosslinked in optional heat treatment performed after the drying (in other words, the non-aqueous secondary battery functional layer may contain a crosslinked product of the above-described binder).

Since the non-aqueous secondary battery functional layer of the present disclosure is formed using the aforementioned slurry composition for non-aqueous secondary battery functional layers, it has high heat contraction resistance. Thus, a non-aqueous secondary battery provided with the non-aqueous secondary battery functional layer formed using the aforementioned slurry composition for non-aqueous secondary battery functional layers can have improved high-temperature cycle characteristics.

<Substrate>

No specific limitations are placed on the substrate onto which the slurry composition for functional layers is applied. For example, an applied film of the slurry composition for functional layers may be formed on a surface of a detachable substrate and the applied film may be dried to form a functional layer, such that the detachable substrate may be peeled from the functional layer. The functional layer peelable from the detachable substrate in this manner can be used as an independent film in formation of a battery member of a secondary battery. Specifically, the functional layer that is peeled from the detachable substrate may be stacked on a separator substrate to form a separator including the functional layer or may be stacked on an electrode substrate to form an electrode including the functional layer.

However, it is preferable that a separator substrate or an electrode substrate is used as the substrate from a perspective of raising battery member production efficiency since a step of peeling the functional layer can be omitted. The functional layer provided on the separator substrate or electrode substrate can suitably be used as a protective layer for improving heat resistance, strength, and so forth of the separator or electrode.

[Separator Substrate]

No specific limitations are placed on the separator substrate, and examples thereof include known separator substrates such as organic separator substrates. The organic separator substrate is a porous member that is made from an organic material. Examples of organic separator substrates include microporous membranes and non-woven fabrics containing a polyolefin resin such as polyethylene or polypropylene, an aromatic polyamide resin, or the like. A microporous membrane or non-woven fabric made from polyethylene is preferred for their excellent strengths. The thickness of the separator substrate can be freely set and is preferably 5 µm or more and 30 µm or less, more preferably 5 µm or more and 20 µm or less, and even more preferably 5 µm or more and 18 µm or less. A separator substrate with a thickness of 5 µm or more can ensure sufficient safety. Moreover, a separator substrate with a thickness of 30 µm or less can prevent reduction in the ion conductivity, prevent deterioration of the rate characteristics of a secondary battery, prevent an increase in the heat contraction force of the separator substrate, and enhance the heat resistance.

[Electrode Substrate]

The electrode substrate (positive/negative electrode substrate) is not specifically limited and may, for example, be an electrode substrate obtained by forming an electrode mixed material layer on a current collector.

The current collector, an electrode active material (positive/negative electrode active material) contained in an electrode mixed material layer, and a binder for electrode mixed material layers (binder for positive/negative electrode mixed material layers), and the method by which the electrode mixed material layer is formed on the current collector may be one of commonly known techniques, such as that described in JP 2013-145763A and WO2015/129408, for example.

<Formation Method of Non-Aqueous Secondary Battery Functional Layer>

Examples of methods by which the functional layer may be formed on a substrate such as the separator substrate or the electrode substrate set forth above include:

1) a method in which the slurry composition for non-aqueous secondary battery functional layers of the present disclosure is applied onto the surface of a separator substrate or an electrode substrate (surface on the electrode mixed material layer side in the case of electrode substrate; same applies below) and is then dried;

2) a method in which a separator substrate or an electrode substrate is immersed in the slurry composition for non-aqueous secondary battery functional layers of the present disclosure and subsequently dried; and 3) a method in which the slurry composition for non-aqueous secondary battery functional layers of the present disclosure is applied onto a detachable substrate, and is dried to produce a functional layer, which is transferred onto a separator substrate or an electrode substrate.

Of these methods, method (1) is particularly preferable since it allows simple control of layer thickness of the functional layer. More specifically, the method 1) includes a step of applying the slurry composition for functional layers onto a substrate (application step) and a step of drying the slurry composition for functional layers that has been applied onto the substrate to form a functional layer (functional layer formation step).

[Application Step]

Examples of methods by which the slurry composition for functional layers can be applied onto the substrate in the application step include, but are not specifically limited to, doctor blading, reverse roll coating, direct roll coating, gravure coating, extrusion coating, and brush coating.

[Functional Layer Formation Step]

The method by which the slurry composition for functional layers on the substrate is dried in the functional layer formation step is not specifically limited and may be a commonly known method. Examples of drying methods that may be used include drying by warm, hot, or low-humidity air; drying in a vacuum; and drying by irradiation with infrared light, an electron beam, or the like. Although no specific limitations are placed on the drying conditions, the drying temperature is preferably 50° C. to 150° C., and the drying time is preferably 5 minutes to 30 minutes.

<Thickness of Functional Layer>

The thickness of the functional layer formed using the slurry composition for non-aqueous secondary battery functional layers of the present disclosure is preferably 0.3 µm or more and more preferably 1.5 µm or more, and is preferably 5.0 µm or less. The functional layer having a thickness of not less than the aforementioned lower limit can further improve the heat resistance and the strength of a battery member provided with a functional layer. Moreover, the functional layer having a thickness of not less than the aforementioned lower limit enables a secondary battery to exhibit excellent rate characteristics. In addition, use of the slurry composition for functional layers of the present disclosure can provide good heat contraction resistance even when the thickness of the functional layer is reduced. Therefore, the thickness of the functional layer can be, for example, 3.0 μm or less, as necessary.

(Battery Member Including Functional Layer)

A battery member (separator or electrode) including the presently disclosed functional layer may include elements other than the presently disclosed functional layer set forth above in addition to the separator substrate or electrode substrate and the presently disclosed functional layer so long as the effects disclosed herein are not significantly lost.

These elements other than the presently disclosed functional layer may be any elements that do not correspond to the presently disclosed functional layer, and one example thereof is an adhesive layer for adhering battery members to one another that may be provided on the presently disclosed functional layer.

(Non-Aqueous Secondary Battery)

The presently disclosed non-aqueous secondary battery includes the non-aqueous secondary battery functional layer of the present disclosure set forth above. More specifically, the non-aqueous secondary battery of the present disclosure includes a positive electrode, a negative electrode, a separator, and an electrolyte solution, and at least one battery member among the positive electrode, the negative electrode, and the separator includes the aforementioned non-aqueous secondary battery functional layer. The presently disclosed non-aqueous secondary battery can exhibit excellent high-temperature cycle characteristics.

<Positive Electrode, Negative Electrode, and Separator>

At least one of the positive electrode, the negative electrode, and the separator used in the presently disclosed secondary battery includes the presently disclosed functional layer. Specifically, an electrode produced by forming an electrode mixed material layer on a current collector to form an electrode substrate and then providing the presently disclosed functional layer on the electrode substrate may be used as a positive electrode that includes a functional layer or a negative electrode that includes a functional layer. Moreover, a separator produced by providing the presently disclosed functional layer on a separator substrate may be used as a separator that includes a functional layer. The electrode substrate and the separator substrate can be any of the examples previously described in the "Non-aqueous secondary battery functional layer" section.

A positive electrode, negative electrode, or separator that does not include a functional layer can be used without any specific limitations. For example, an electrode composed of an electrode substrate such as previously described or a separator composed of a separator substrate such as previously described may be used.

<Electrolyte Solution>

The electrolyte solution is typically an organic electrolyte solution obtained by dissolving a supporting electrolyte in an organic solvent. The supporting electrolyte may, for example, be a lithium salt in the case of a lithium ion secondary battery. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these, $LiPF_6$, $LiClO_4$, and $CF_3SO_3Li$ are preferable as they readily dissolve in solvents and exhibit a high degree of dissociation. Note that one electrolyte may be used individually or two or more electrolytes may be used in combination. In general, the lithium ion conductivity tends to increase when a supporting electrolyte having a high degree of dissociation is used. Therefore, the lithium ion conductivity can be adjusted through the type of supporting electrolyte that is used.

The organic solvent used in the electrolyte solution may be any organic solvent in which the supporting electrolyte dissolves. Examples of suitable organic solvents that can be used in the case of a lithium ion secondary battery include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such organic solvents may be used. Of these solvents, carbonates are preferable due to having high permittivity and a wide stable potential region. Normally, as the viscosity of the solvent being used is lower, the lithium ion conductivity tends to increase. Hence, the lithium ion conductivity can be adjusted by the type of solvent.

The concentration of the electrolyte in the electrolyte solution can be adjusted as appropriate. Furthermore, known additives may be added to the electrolyte solution.

(Method of Producing Non-Aqueous Secondary Battery)

The presently disclosed non-aqueous secondary battery set forth above can be produced by, for example, stacking the positive electrode and the negative electrode having the separator interposed therebetween, performing rolling, folding, or the like of the resultant stack as necessary to place the resultant stack in a battery container, injecting the electrolyte solution into the battery container, and sealing the battery container. At least one member among the positive electrode, the negative electrode, and the separator is a functional layer-equipped member. An expanded metal, an overcurrent prevention element such as a fuse or a PTC element, a lead plate, or the like may be placed in the battery container as required in order to prevent pressure from increasing inside the battery container and prevent overcharging or overdischarging from occurring. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%", "ppm", and "parts" used in expressing quantities are by mass, unless otherwise specified.

Moreover, in the case of a polymer that is produced through copolymerization of a plurality of types of monomers, the proportion constituted by a monomer unit formed through polymerization of a given monomer in the polymer is normally, unless otherwise specified, the same as the ratio (charging ratio) of the given monomer among all monomers used in polymerization of the polymer.

In each of Examples and Comparative Examples, the degree of etherification and the average degree of polymerization of each water-soluble polymer, the redispersibility of each slurry composition, the peel strength and the heat contraction resistance of each functional layer, the high-temperature cycle characteristics of each secondary battery were measured and evaluated in the following procedures.

<Preparation of Water-Soluble Polymer>

The degree of etherification (degree of substitution) of a water-soluble polymer is a value determined by the following method.

First, 0.5 g to 0.7 g of each sample (a salt of carboxymethyl cellulose in Examples 1-3 and 5-10 and Comparative Examples 1-2: a cellulosic derivative having a carboxymethyl group(s) as a substituent(s) in an anhydroglucose) was precisely weighed and was incinerated in a porcelain crucible. After cooling, 500 mL of the resultant incinerated product was transferred to a beaker. Approximately 250 mL of water was added to the beaker and 35 mL of N/10 sulfuric acid was added to the beaker using a pipette. The contents of the beaker were boiled for 30 minutes. After cooling, phenolphthalein indicator was added, and then back titration of the excess acid was performed using N/10 potassium hydroxide and the degree of substitution was calculated by the following formulae.

$$A = (a \times f - b \times f^1)/\text{Sample (g)} - \text{Alkalinity (or +acidity)}$$

Degree of substitution = $M \times A/(10,000 - 80 A)$

A: Amount (mL) of N/10 sulfuric acid consumed by bound alkali metal ions in 1 g of sample
a: Used amount (mL) of N/10 sulfuric acid
f: Titer coefficient of N/10 sulfuric acid
b: Titration amount (mL) of N/10 potassium hydroxide
$f^1$: Titer coefficient of N/10 potassium hydroxide
M: Weight average molecular weight of sample Note that the alkalinity (or acidity) was determined by the following method and formula.

Approximately 1 g of the sample was dissolved in 200 mL of water, 5 mL of N/10 sulfuric acid was added thereto, and then boiling was performed for 10 minutes. After subsequent cooling, phenolphthalein indicator was added and titration with N/10 potassium hydroxide was performed. The titration amount in this titration was taken to be S mL. A blank test was performed at the same time and the titration amount therein was taken to be B mL. The alkalinity (or acidity) was determined from the following formula. Note that when $(B-S) \times f^1$ had a positive value, the alkalinity was obtained, and when $(B-S) \times f^1$ had a negative value, the acidity was obtained.

$$\text{Alkalinity (acidity)} = (B-S) \times f^1/\text{Sample (g)}$$

$f^1$: Titer coefficient of N/10 potassium hydroxide

<Average Degree of Polymerization of Water-Soluble Polymer>

The average degree of polymerization of each water-soluble polymer can be measured using the viscosity method. For example, the limiting viscosity ($\eta$) is determined by the Ubbelohde viscometer using a 0.1-N NaCl solution as a solvent, and the average degree of polymerization P can be calculated from the following equation (1) based on the Staudinger's viscosity rule:

$$\eta = K_m \times P \times \alpha \quad (1)$$

In Equation (1), $K_m$ and $\alpha$ are constants determined by the type and polymerization conditions (solvent and temperature used for polymerization) of the polymer. In the examples of the present disclosure, $K_m$ and $\alpha$ were 12.3 and 0.91, respectively.

<Redispersibility of Slurry Composition>

Each of the slurry composition for functional layers prepared in Examples and Comparative Examples was transferred to a storage vessel (100-L drum), which was then tightly sealed, and was stored for 3 months at 20° C. Note that the amount of the slurry composition for functional layers in the storage vessel was adjusted such that volume of space formed in the storage vessel was 30% by volume of the capacity of the storage vessel, and then the storage vessel was tightly sealed. After the 3-month storage, the slurry composition was set in a tilting stirrer with a tilt angle of the rotation axis of 70°, and the storage container was places such that the axis extending between centers of the upper and bottom surface of the storage container was aligned to the rotation axis. Thereafter, a redispersion treatment was carried out by repeating 32 paths of operations, each path of operation comprised of 15 clockwise rotations followed by 15 counter-clockwise rotations. The rotation speed was 60 rpm. Then, $W_0$ (g) of the redispersed slurry composition for functional layers was filtrated through a #635 SUS wire mesh. Next, material collected on the wire mesh was washed with deionized water and was subsequently dried for 1 hour at 105° C. The wire mesh having the dried collected material attached thereto was weighed and the amount of mesh residue was calculated by the following formula (2):

$$\text{Amount of mesh residue (ppm by mass)} = (a-b)/(W_0 \times c/100) \times 1{,}000{,}000 \quad (2)$$

where, a: Mass (g) of wire mesh having dried collected material attached thereto
b: Mass (g) of wire mesh
c: Solid content concentration of slurry composition for functional layers (% by mass)
$W_0$: Mass (g) of slurry composition for functional layers The amount of mesh residue calculated was evaluated based on the following criteria. A smaller amount of mesh residue indicated better dispersibility of the slurry composition for functional layers after the redispersion treatment.

A: Amount of the mesh residue was less than 50 ppm by mass
B: Amount of the mesh residue was 50 ppm by mass or more and less than 150 ppm by mass
C: Amount of the mesh residue was 150 ppm by mass or more <Peel Strength of Functional Layer>

Each of functional layer-attached separators fabricated in Examples 1-9 and Comparative Examples 1-2 and a functional layer-attached positive electrode fabricated in Example 10 was cut into a rectangle of 100 mm in length and 10 mm in width to obtain a test piece. A cellophane tape was fixed to a test bed. An adhesive cellophane tape specified in JIS Z1522 was used. The test piece was attached to the adhesive cellophane tape with the functional layer surface facing downward. As a result, the test piece was attached to the adhesive cellophane tape on the functional layer surface. Subsequently, the stress at the time when the test piece was peeled by pulling up one end in the vertical direction at a pulling rate of 10 mm/minute was measured. This measurement was performed three times and an average value of the measurements was evaluated as the peel strength by the following criteria. A larger peel strength indicated larger binding force of the functional layer to the separator substrate/electrode and thus indicated stronger adherence.

A: Peel strength was 130 N/m or more
B: Peel strength was 120 N/m or more and less than 130 N/m
C: Peel strength was less than 120 N/m <Heat Contraction Resistance of Functional Layer>

Each of the functional layer-attached separators fabricated in Examples 1-9 and Comparative Examples 1-2 and the functional layer-attached positive electrode fabricated in Example 10 was cut into a square of 12 cm in length and 12 cm in width, and a rectangle having a side length of 10 cm was drawn inside the cut-out rectangle to obtain a test piece. The test piece was left for 1 hour in a 150° C. thermostatic bath and the change in area of the square shape drawn within the test piece (={(area of square shape prior to being left−area of square shape after being left)/area of square shape prior to being left}×100%) was determined thereafter as a rate of heat contraction, which was evaluated by the following standard. A smaller heat contraction rate indicated that the functional layer-attached separator/electrode had better heat contraction resistance.

A: Heat contraction rate was less than 5%
B: Heat contraction rate was 5% or more and less than 10%
C: Heat contraction rate was 10% or more <High-Temperature Cycle Characteristics of Secondary Battery>

Each wound laminate cell having a discharge capacity of 800 mAh fabricated in Examples and Comparative Examples was subjected to 200 charge/discharge cycles of charging to 4.35 V and discharging to 3 V by a 0.5 C constant-current method at an ambient temperature of 45° C., and the discharge capacity was measured. Note that an average value for 5 cells was taken to be the measured value. The charge/discharge capacity retention rate was determined by calculating the electrical capacity at completion of 200 cycles as a percentage relative to the discharge capacity at completion of 3 cycles, for use as evaluation criteria of cycle characteristics. A higher value indicated better high-temperature cycle characteristics of the secondary battery.

A: Charge/discharge capacity retention rate was 80% or more
B: Charge/discharge capacity retention rate was 70% or more and less than 80%
C: Charge/discharge capacity retention was 60% or more and less than 70%
D: Charge/discharge capacity retention rate was less than 60%

Example 1

<Preparation of Binder>

A reaction vessel equipped with a stirrer was charged with 70 parts of deionized water, 0.15 parts of sodium lauryl sulfate (EMAL 2F manufactured by Kao Corporation) as an emulsifier, and 0.5 parts of ammonium persulfate as a polymerization initiator. The gas phase of the reaction vessel was purged with nitrogen gas and the contents of the reaction vessel were heated to 60° C. A monomer composition was obtained in a separate vessel by mixing 50 parts of deionized water, 0.8 parts of sodium dodecylbenzenesulfonate as an emulsifier, 5 parts of acrylonitrile as a (meth)acrylonitrile monomer, 90.8 parts of butyl acrylate as a (meth)acrylic acid ester monomer, 2 parts of methacrylic acid as an acidic group-containing monomer, 1 part of allyl glycidyl ether and 1.2 parts of N-methylolacrylamide as cross-linkable monomers, and 0.15 parts of ethylenediaminetetraacetic acid sodium salt tetrahydrate (Chelest 400G manufactured by Chelest Corporation) as a chelating agent. The monomer composition was continuously added to the reaction vessel over 4 hours to perform polymerization. The reaction was carried out at 60° C. during the addition. After the addition, further stirring was performed for 3 hours at 70° C., and then the reaction was ended to yield a water dispersion of a binder (acrylic polymer). The resultant acrylic polymer was a particulate polymer that was present in particulate form in the slurry composition. The glass-transition temperature (JIS K7121) of the resultant acrylic polymer was −48° C. The particle diameter was 0.3 µm.

<Preparation of Dispersant>

A monomer composition was obtained by mixing 50 parts of deionized water, 80 parts of acrylic acid as a carboxylic acid group-containing monomer, and 19.92 parts of 2-acrylamido-2-methylpropane sulfonic acid, and 0.08 parts of 2-(N-acryloyl)amino-2-methyl-1,3-propane-disulfonic acid as sulfo group-containing monomers. Next, 150 parts of deionized water was charged to a four-neck flask equipped with a thermometer, a stirrer, and a reflux condenser, and was heated to 80° C. The monomer composition and 10 parts of a 30% sodium persulfate aqueous solution as a polymerization initiator were each continuously drip fed into the flask under stirring over 3 hours using a metering pump to perform a polymerization reaction at 80° C. After this drip feeding was completed, the system was maintained at 80° C. for 1 hour of aging to complete the polymerization reaction. Thereafter, 120 parts of a 32% sodium hydroxide aqueous solution was added into the flask to completely neutralize the reaction liquid and obtain an aqueous solution of a dispersant as water-soluble macromolecules (acrylic acid-sulfonic acid copolymer; average degree of polymerization: 12). Note that the average degree of polymerization of the water-soluble macromolecules was measured in the same manner as that of the water-soluble polymer.

<Preparation of Slurry Composition for Secondary Battery Functional Layers>

A mixed solution was obtained by mixing 100 parts of alumina particles (volume average particles diameter: 0.8 µm) as non-conductive particles and 0.5 parts of an aqueous solution of the water-soluble macromolecules prepared as described above in terms of solid content as a dispersant, and further adding deionized water such that the solid content concentration becomes 55% and mixing them. Next, this mixed liquid was subjected to one pass of dispersing using a rotor/stator type media-less dispersing device under conditions of a circumferential speed of 10 m/s and a flow rate of 200 L/h to obtain a water dispersion.

A preparation solution was then obtained by mixing the water dispersion and 37.5 parts (1.5 parts in terms of amount of carboxymethyl cellulose) of a 4% aqueous solution of a salt of carboxymethyl cellulose (degree of polymerization: 310; degree of etherification: 0.9) as a water-soluble polymer, and subsequently mixing 13.3 parts (6 parts in terms of amount of the binder) of the water dispersion of the binder prepared as described above, and 0.2 parts in terms of solid content of an aqueous solution of polyoxyethylene lauryl ether (EMULGEN® 106 from Kao Corporation; EMULGEN is registered trademark in Japan, other countries, or both) which was a polyoxyalkylene alkyl ether surfactant as a wetting agent. The obtained preparation solution was filtered through a filter (average pore diameter: 10 µm) and was then passed through a magnetic filter (manufactured by TOK ENGINEERING Co., Ltd.) 10 times under conditions of room temperature and a magnetic flux density of 8,000 gauss to remove magnetic material and obtain a slurry composition for functional layers.

<Production of Functional Layer and Separator>

An organic separator substrate made from polyethylene (produced by successive biaxial stretching; thickness: 7 µm) made from polyethylene (PE) composition containing 40% by mass of ultra-high molecular weight polyethylene having an weight average molecular weight (Mw) of 2.4×10$^6$ and 60% by mass of a high-density polyethylene composition having an Mw of 2.6×10⁵, was provided as a separator substrate made from polyethylene. The slurry composition was subjected to the same redispersion treatment as that was carried out for the evaluation of the redispersibility of the slurry composition. A surface of the prepared separator substrate was coated with the redispersed slurry composition by a gravure coater so as to have a film thickness of approximately 2 μm after drying, and drying was carried out at 50° C. for 3 minutes. In this manner, a separator was obtained which had a functional layer formed on the one surface of the separator substrate. Using the resultant separator, the peel strength and heat contraction resistance of the functional layer were then evaluated in accordance with the procedures described above. The results are listed in Table 1.

<Production of Positive Electrode>

A slurry composition for positive electrodes was produced by mixing 95 parts of $LiCoO_2$ as a positive electrode active material, 2 parts of acetylene black (HS-100 manufactured by Denka Company Limited) as a conductive material, 3 parts by solid content equivalents of polyvinylidene fluoride (KF-1100 manufactured by Kureha Corporation) as a binder for positive electrode mixed material layers, and 20 parts of N-methylpyrrolidone.

The obtained slurry composition for positive electrodes was applied onto aluminum foil (current collector) of 18 μm in thickness using a comma coater and was dried for 3 hours at 120° C. to obtain a positive electrode web. The positive electrode web was rolled by roll pressing to obtain a positive electrode of 100 μm in thickness.

<Production of Negative Electrode>

A 5 MPa pressure vessel equipped with a stirrer was charged with 33 parts of 1,3-butadiene, 3.5 parts of itaconic acid, 63.5 parts of styrene, 4 parts of sodium dodecylbenzenesulfonate as an emulsifier, 200 parts of deionized water, and 0.5 parts of potassium persulfate as a polymerization initiator. The contents of the pressure vessel were sufficiently stirred and were then heated to 50° C. to initiate polymerization. After 12 hours had elapsed, steam was introduced into the pressure vessel to remove unreacted monomers. As a result, a water dispersion containing a desired binder for negative electrode mixed material layers was obtained. A planetary mixer equipped with a disper blade was charged with 70 parts of artificial graphite (specific surface area: 4 m²/g; volume-average particle diameter: 24.5 μm) and 30 parts of $SiO_x$ (volume-average particle diameter: 5 μm) as negative electrode active materials, and 1 part in terms of solid content of a 1% aqueous solution of a salt of carboxymethyl cellulose (BSH-12 manufactured by DKS Co., Ltd.) as a thickener. The solid content concentration was adjusted to 55% with deionized water and then mixing was performed for 60 minutes at 25° C. Next, the solid content concentration was adjusted to 52% with deionized water. Further stirring was subsequently performed for 15 minutes at 25° C. to yield a mixed liquid. Next, 1.0 parts in terms of solid content of the water dispersion containing the binder for negative electrode mixed material layers was added to this mixed liquid. The final solid content concentration was adjusted to 50% through addition of deionized water and further stirring was performed for 10 minutes. The resultant mixture was subjected to a defoaming process under reduced pressure to yield a slurry composition for negative electrodes having good fluidity. The obtained slurry composition for negative electrodes was applied onto copper foil (current collector) of 20 μm in thickness using a comma coater so as to have a film thickness of approximately 150 μm after drying. The applied slurry composition was dried by conveying the copper foil inside a 60° C. oven for 2 minutes at a speed of 0.5 m/minute. Heat treatment was subsequently performed for 2 minutes at 120° C. to obtain a negative electrode web. The negative electrode web was rolled by roll pressing to obtain a negative electrode of 100 μm in thickness.

<Production of Lithium Ion Secondary Battery>

The post-press positive electrode obtained above was cut into a 49 cm×5 cm piece. Then, a 55 cm×5.5 cm cut piece of the separator was placed on the surface of the positive electrode active material layer (positive electrode mixed material layer) of the positive electrode, such that the functional layer of the separator faced the positive electrode active material layer. Further, the post-press negative electrode was cut into a 50 cm×5.2 cm piece and placed on the side of the separator opposite to the positive electrode such that the surface of the negative electrode active material layer (negative electrode mixed material layer) faced the separator. Further, a piece of the separator that was cut out to a dimension of 55 cm×5.5 cm was placed on the surface of the negative electrode on the current collector side. This laminate was wound up by a winder into a roll. The roll was pressed at 60° C. under a pressure of 0.5 MPa into a flat form and enclosed by an aluminum packaging case as a battery outer package. An electrolyte solution (solvent: EC/EMC/VC (mixing ratio: 68.5/30/1.5 (by volume)); electrolyte: 1M $LiPF_6$) was injected so as not to leave air. In order to tightly seal up the opening of the aluminum outer package, the aluminum package was closed by heat sealing at 150° C. In this manner, a spirally wound lithium ion secondary battery with a capacity of 800 mAh was manufactured.

The high-temperature cycle characteristics of the produced lithium ion secondary battery were then evaluated according to the above-described procedure.

Examples 2 to 3

A slurry composition and a secondary battery of each of Examples 2 and 3 were produced in the same manner as in Example 1, except that a sodium salt of carboxymethyl cellulose to be blended was changed to a sodium salt of carboxymethyl cellulose having a degree of polymerization of 130 and a degree of etherification of 0.7 (Example 2), or a degree of polymerization of 430 and a degree of etherification of 0.8 (Example 3), upon formulating the slurry composition. The evaluations were then made in the same manner as in Example 1. The results are listed in Table 1.

Example 4

A slurry composition and a secondary battery were produced in the same manner as in Example 1, except that hydroxyethyl cellulose (degree of polymerization: 220) was blended in place of the sodium salt of carboxymethyl cellulose upon formulating the slurry composition. The evaluations were then made in the same manner as in Example 1. The results are listed in Table 1. The degree of etherification of hydroxyethyl cellulose could not be determined by the above-described procedure.

Example 5

A slurry composition and a secondary battery were produced in the same manner as in Example 1, except that 0.2 parts of a salt of carboxymethyl cellulose having a degree of polymerization of 310 and a degree of etherification of 0.7 was blended as the carboxymethyl cellulose upon formulating the slurry composition. The evaluations were then made in the same manner as in Example 1. The results are listed in Table 1.

Examples 6-8

A slurry composition and a secondary battery of each of Examples 6-8 were produced in the same manner as in Example 1, except that the amount of a salt of carboxymethyl cellulose as the water-soluble polymer and/or the amount of the wetting agent were changed as listed in Table 1, thereby modifying the values in the "Wetting agent/water-soluble polymer (by mass)" as in Table 1, upon formulating respective slurry compositions. The evaluations were then made in the same manner as in Example 1. The results are listed in Table 1.

Example 9

A slurry composition and a secondary battery were produced in the same manner as in Example 1, except that crosslinked polystyrene particles (volume average particles diameter: 0.5 μm; glass-transition temperature: 100° C.) was blended in place of the alumina particles as the non-conductive particles upon formulating the slurry composition. The evaluations were then made in the same manner as in Example 1. The results are listed in Table 1.

The crosslinked polystyrene particles were prepared in the following procedure. A reactor equipped with a stirrer was charged with 9 parts of polystyrene particles (weight-average molecular weight: 17,000; average particle diameter: 0.2 μm), 4 parts of sodium dodecylbenzenesulfonate as an emulsifier, 70 parts of divinylbenzene as a cross-linkable monomer, 10 parts of styrene, 1 part of sodium persulfate as a polymerization initiator, and 800 parts of deionized water. Thereafter, the materials were polymerized for 1 hour at 80° C. under stirring while blowing in nitrogen gas. Next, 0.5 parts of sodium persulfate as a polymerization initiator, 5 parts of styrene, 4.5 parts of methacrylic acid, 0.5 parts of 2-hydroxyethyl methacrylate, 1 part of polyvinyl alcohol, and 20 parts of deionized water were mixed to prepare an emulsion. This emulsion was continuously added into the reactor over 3 hours at 80° C., and polymerization was completed to obtain crosslinked polystyrene particles.

Example 10

A slurry composition was prepared in the same manner in Example 1. A positive electrode mix material layer was formed by applying a slurry composition for positive electrodes on a positive electrode fabricated in the same manner as in Example 1. A functional layer was then formed on the positive electrode by applying the slurry composition on a surface of the positive electrode as the substrate, and drying under the same condition as in Example 1, to thereby obtain the positive electrode provided with a functional layer. The peel strength and the heat contraction resistance of the resultant positive electrode provided with the functional layer were evaluated in the same manner as in Example 1.

A lithium ion secondary battery was produced in the same manner as in Example 1 using that positive electrode, a negative electrode obtained in the same manner as in Example 1, and a separator substrate that was a porous substrate made from polyethylene. Evaluations were made in the same manner in Example 1. The results are listed in Table 1.

Comparative Examples 1-2

A slurry composition and a secondary battery of each of Comparative Examples 1-2 were produced in the same manner as in Example 1, except that a sodium salt of carboxymethyl cellulose to be blended was changed to a sodium salt of carboxymethyl cellulose having a degree of polymerization of 21 and a degree of etherification of 0.8 (Comparative Example 1), or a degree of polymerization of 600 and a degree of etherification of 0.7 (Comparative Example 2), upon formulating the slurry composition. The evaluations were then made in the same manner as in Example 1. The results are listed in Table 1.

In Table 1, shown below:
"PST" represents cross-linkable polystyrene particles;
"CMC" represents a salt of carboxymethyl cellulose;
"HEC" represents hydroxyethyl cellulose;
"POE" represents polyoxyethylene lauryl ether;
"ACR" represents acrylic polymer; and
"SP" represents a separator.

TABLE 1

| | | | Examples | | | | | |
|---|---|---|---|---|---|---|---|---|
| | | | 1 | 2 | 3 | 4 | 5 | 6 |
| Slurry composition for non-aqueous secondary battery functional layers | Non-conductive particles | Type | alumina | alumina | alumina | alumina | alumina | alumina |
| | | Content [parts by mass] | 100 | 100 | 100 | 100 | 100 | 100 |
| | Water-soluble polymer | Type | CMC | CMC | CMC | HEC | CMC | CMC |
| | | Avg. degree of polymerization [-] | 310 | 130 | 430 | 220 | 310 | 310 |
| | | Degree of etherification [-] | 0.9 | 0.7 | 0.8 | — | 0.7 | 0.9 |
| | | Content [parts by mass] | 1.5 | 1.5 | 1.5 | 1.5 | 0.2 | 4 |
| | Wetting agent | Type | POE | POE | POE | POE | POE | POE |
| | | Content [parts by mass] | 0.2 | 0.2 | 0.2 | 0.2 | 0.2 | 0.2 |
| | Wetting agent/water-soluble polymer (by mass) [-] | | 0.13 | 0.13 | 0.13 | 0.13 | 1 | 0.05 |
| | Binder | Type | ACR | ACR | ACR | ACR | ACR | ACR |
| | | Content [parts by mass] | 6 | 6 | 6 | 6 | 6 | 6 |
| Location to attach functional layer | | | SP | SP | SP | SP | SP | SP |
| Evaluations | Redispersibility | | A | A | B | A | A | A |

TABLE 1-continued

| | | | | | | | | |
|---|---|---|---|---|---|---|---|---|
| | Peel strength | | A | A | A | A | B | A |
| | Heat contraction resistance | | A | B | A | A | A | B |
| | High-temperature cycle characteristics | | A | A | A | B | B | B |

| | | | Examples | | | | Comparative Examples | |
|---|---|---|---|---|---|---|---|---|
| | | | 7 | 8 | 9 | 10 | 1 | 2 |
| Slurry composition for non-aqueous secondary battery functional layers | Non-conductive particles | Type | alumina | alumina | PST | alumina | alumina | alumina |
| | | Content [parts by mass] | 100 | 100 | 100 | 100 | 100 | 100 |
| | Water-soluble polymer | Type | CMC | CMC | CMC | CMC | CMC | CMC |
| | | Avg. degree of polymerization [-] | 310 | 310 | 310 | 310 | 21 | 600 |
| | | Degree of etherification [-] | 0.9 | 0.9 | 0.9 | 0.9 | 0.8 | 0.7 |
| | | Content [parts by mass] | 0.5 | 3.5 | 1.5 | 1.5 | 1.5 | 1.5 |
| | Wetting agent | Type | POE | POE | POE | POE | POE | POE |
| | | Content [parts by mass] | 0.04 | 1.2 | 0.2 | 0.2 | 0.2 | 0.2 |
| | Wetting agent/water-soluble polymer (by mass) [-] | | 0.08 | 0.34 | 0.13 | 0.13 | 0.13 | 0.13 |
| | Binder | Type | ACR | ACR | ACR | ACR | ACR | ACR |
| | | Content [parts by mass] | 6 | 6 | 6 | 6 | 6 | 6 |
| Location to attach functional layer | | | SP | SP | SP | Positive Electrode | SP | SP |
| Evaluations | Redispersibility | | A | A | A | A | B | C |
| | Peel strength | | B | A | A | A | C | C |
| | Heat contraction resistance | | B | A | A | A | C | C |
| | High-temperature cycle characteristics | | B | B | A | A | D | D |

It is understood from Table 1 that the slurry compositions for functional layers in Examples 1-10 containing the water-soluble polymers having average degrees of polymerization of 50 or more and 450 or less had excellent dispersibility of the slurry compositions for functional layers, imparted high heat contraction resistances to the resultant functional layers, and were capable of improving high-temperature cycle characteristics of the secondary batteries.

In contrast, it is also understood from Table 1 that the slurry composition for functional layers in Comparative Example 1 containing the water-soluble polymers having an average degree of polymerization of less than 50, and the slurry composition for functional layers in Comparative Example 2 containing the water-soluble polymers having an average degree of polymerization of more than 450 had low dispersibility of the slurry compositions for functional layers, the heat contraction resistances of the resultant functional layers were low, and the high-temperature cycle characteristics of the secondary batteries were reduced.

INDUSTRIAL APPLICABILITY

The slurry composition for non-aqueous secondary battery functional layers of the present disclosure has an excellent dispersibility, and this slurry composition enables formation of non-aqueous secondary battery functional layers having excellent heat contraction resistance.

The non-aqueous secondary battery functional layer of the present disclosure allows a non-aqueous secondary battery to exhibit excellent high-temperature cycle characteristics.

The present disclosure enables provision of a non-aqueous secondary battery having excellent high-temperature cycle characteristics.

The invention claimed is:

1. A slurry composition for non-aqueous secondary battery functional layers comprising:
   non-conductive particles;
   a water-soluble polymer;
   a binder;
   water; and
   a wetting agent,
   wherein the water-soluble polymer has an average degree of polymerization of 150 or more and 450 or less, and a mass ratio of a content of the wetting agent to a content of the water-soluble polymer in the slurry composition is 0.1 or more and 0.9 or less.

2. The slurry composition for non-aqueous secondary battery functional layers of claim 1, wherein the water-soluble polymer is a cellulosic derivative.

3. The slurry composition for non-aqueous secondary battery functional layers of claim 1, wherein the water-soluble polymer is carboxymethyl cellulose or a salt of carboxymethyl cellulose.

4. The slurry composition for non-aqueous secondary battery functional layers of claim 2, wherein the water-soluble polymer has a degree of etherification of 0.6 or more.

5. The slurry composition for non-aqueous secondary battery functional layers of claim 1, wherein the content of the water-soluble polymer is 0.2 parts by mass or more and 4.5 parts by mass or less per 100 parts by mass of the non-conductive particles.

6. The slurry composition for non-aqueous secondary battery functional layers of claim 1, wherein the content of the wetting agent is 0.01 parts by mass or more and 2.0 parts by mass or less per 100 parts by mass of the non-conductive particles.

7. A non-aqueous secondary battery functional layer formed using the slurry composition for non-aqueous secondary battery functional layers of claim 1.

8. The non-aqueous secondary battery functional layer of claim 7, having a thickness of 5.0 μm or less.

9. A non-aqueous secondary battery comprising:
the non-aqueous secondary battery functional layer according to claim 7.

* * * * *